United States Patent [19]
Davis

[11] 3,877,993

[45] Apr. 15, 1975

[54] DRY CELL WITH CORROSION INHIBITOR

[75] Inventor: Stuart M. Davis, Madison, Wis.

[73] Assignee: ESB Incorporated, Philadelphia, Pa.

[22] Filed: Nov. 29, 1973

[21] Appl. No.: 420,015

[52] U.S. Cl.................. 136/107; 136/6 L; 136/155
[51] Int. Cl. .......................................... H01m 21/00
[58] Field of Search.............. 136/6 R, 6 L, 30, 125, 136/100 R, 83 R, 107, 154, 102–103, 161, 155, 137, 138; 204/55 R; 252/388, 390, 393; 260/88.3 R, 89.7 N

[56] References Cited
UNITED STATES PATENTS

| | | | |
|---|---|---|---|
| 2,897,250 | 7/1959 | Klopp | 136/107 |
| 3,160,526 | 12/1964 | Ruetschi | 136/154 X |
| 3,533,843 | 10/1970 | Jerabek et al. | 136/30 |
| 3,634,138 | 1/1972 | Voorhies | 136/107 X |
| 3,660,170 | 5/1972 | Rampel | 136/154 |

Primary Examiner—Anthony Skapars

[57] ABSTRACT

To a galvanic cell comprising a metallic anode, a depolarizer type cathode and an electrolyte is added a polymerized quaternary ammonium salt having at least two methyl groups and having a molecular weight between about 2,000 and about 100,000. Typical addition agents are:

1. poly dimethyl diallyl ammonium chloride;
2. co-polymerized dimethyl diallyl ammonium chloride and acrylamide;
3. co-polymerized dimethyl diallyl ammonium chloride and diacetone acrylamide;
4. co-polymerized dimethyl diallyl ammonium chloride and methyl dodecyl-ammonium chloride;
5. polyvinyl benzyl trimethyl ammonium chloride.

The addition agent reduces the stand deterioration of the negative plates and improves the heavy drain performance of the battery.

14 Claims, No Drawings

DRY CELL WITH CORROSION INHIBITOR

BACKGROUND OF THE INVENTION

1. Field of the Invention

This invention relates generally to dry cells of the type known as LeClanche cells. In particular, it relates to an addition agent for reducing the stand losses of the zinc anode.

2. Description of the Prior Art

A congenital weakness of dry cell batteries of the LeClanche type is the fact that they lose capacity in storage prior to or during use. The effect is more pronounced at high temperatures, and it is due in great measure to the reaction of the zinc anode with the aqueous portion of the electrolyte. A byproduct of the reaction of zinc with water is hydrogen. Provision must be made for liberating the hydrogen gas, otherwise the cell may rupture. The escape of gas from the cell often is accompanied by electrolyte. The electrolyte is corrosive and can harm the device containing the dry cell.

Many materials have been added to dry cells in an effort to reduce this form of deterioration. The addition of mercury to the zinc has been found to be one of the most effective ways to reduce the local action. Mercury and mercury compounds have been used for this purpose for a great many years.

However, mercury is a dangerously toxic material. When used in manufacture, considerable care must be exercized to prevent mercury pick-up by the working group. Most dry cell batteries are discarded after use. In almost any method of final disposal, the mercury content is disseminated into the surroundings either as mercury molecules in the air or as compounds to be dissolved and washed into the water-shed.

Mercury added to zinc weakens the zinc. When the mercury content is much over 10%, the zinc loses all strength and turns into gritty particles. Thus, the normal limit for mercury is about 7%, although more would be desirable from a gas control standpoint.

The present cost of mercury is about 21 times the cost of zinc. Therefore, the cost of even a modest mercury addition may be quite significant in the overall cost of a cell using zinc mercury alloy.

Another troublesome property of mercury is that it tends to amalgamate metal parts of the machinery used in its handling and is generally difficult to handle on a manufacturing scale.

Apart from mercury, a wide variety of organic materials have been suggested as local action inhibitors. Among these materials will be found:

Hexadecyl amine, and other amines
Materials having the general formula $RSO_2NHCH_2COOM$ and $RNH(OR_1)PO(ONH_3R_2)$
Where R is an aliphatic hydrogen radical containing 8–20 carbon atoms, $R_1$ the same, containing 1–10 carbons and $R_2$ is a radical from the same group as R.
M - univalent metal
N-N diethyl carbonilide
4 biphenylcarbonitrile
benzyl tert-butanol
terphthalic acid
4 biphenylcarboxylic acid
triphenylchloromethane
1 chloro-3 fluorobenzene
P dicyclohexylbenzene
acridine
1-3 diphenoxy propane
amine carboxylic chelating agents It will be seen from this partial list that many forms of organic materials can inhibit the local action of zinc in the LeClanche cell system. There does not seem to be any great generic similarity among the materials although they are of medium chain length and have rather low solubilities in water. None of these materials has proven to be entirely satisfactory and most present day dry cells use mercury as an inhibitor.

Numerous materials have been proposed for the reduction of corrosion of metals. A particular class of materials known as Quaternary Ammonium compounds have been recommended as corrosion inhibitors for use in acid pickling baths, flue gas scrubbers in cutting oils and in the petroleum industry. These chemicals are surface active agents and are cationic wetting foaming and emulsifying agents.

In experiments leading to the present invention, it was found that materials of the Quaternary Ammonium chloride type as recommended for corrosion inhibition had no effect on or even increased the rate of attack on the zinc in a LeClanche type dry cell.

Quaternary ammonium trihalides have been proposed as depolarizing agents for dry cell use. Other quaternary ammonium salts, namely certain tetraalkylammonium salts have been proposed as materials to increase the cycle life of a secondary type cell having zinc anode, an organic type depolarizer and an electrolyte comprising an aqueous solution of zinc and ammonium chloride. These materials have been coated on the surface of the zinc anode.

A material having the general structure of co-polymerized dimethyl dially ammonium chloride and acrylamide is known. It is sold as a coagulant for the water treating trade.

A material having the general structure of co-polymerized dimethyl diallyl ammonium chloride and diacetone acrylamide is known. It is used to make paper conductive for use in office copy machines.

A material having the general structure of polyvinyl benzyltrimethyl ammonium chloride is known. It is used in the manufacture of conductive papers for office copy machines.

A material having the general structure of polymerized dimethyl diallyl ammonium chloride is known. This material in a high molecular weight version is used by the water treating industry. In a lower molecular weight version, it is used to render paper conductive for use in office copy machines.

A material having the general structure of co-polymerized dimethyl diallyl ammonium chloride and methyl dodecyl diallyl ammonium chloride is known. It is used to make paper conductive for use in office copy machines.

SUMMARY OF THE INVENTION

To an electrochemical cell including a manganese dioxide depolarizer and a zinc anode is added a polymerized quaternary salt such as polyvinyl benzyl trimethyl ammonium chloride or a polymerized dimethyl diallyl ammonium salt such as polymerized dimethyl diallyl ammonium chloride, co-polymerized dimethyl diallyl ammonium chloride and acrylamide, copolymerized dimethyl diallyl ammonium chloride and diacetone acrylamide, and copolymerized dimethyl diallyl ammonium chloride and methyl dodecyl ammonium chloride. The addition may be made to one or more of the cell components; namely, the depolarizer mix, the electrolyte, the separation means or the anode.

The effect of the agent is to reduce the loss of cell capacity with cell age. The beneficial effects are found both in cells wherein the zinc is amalgamated with mercury and in cells in which there is no mercury.

A further advantage of the additive agent is that it improves the performance of the cell even when new. This is seen as an increase in cell voltage under conditions of heavy drain. Although the addition of both mercury and the agent gives the lowest loss with age, the beneficial effect of the agent alone is roughly equal to that of mercury. Its use can eliminate the need for mercury with its high cost and its known harmful effects on the ecology.

The additive is effective in concentrations ranging from about 0.1 to 5% of the total zinc metal in the cell. The mechanism by which the materials provide a corrosion inhibiting feature to electrochemical cells is not exactly understood. In a dry state, the materials are conductors of electricity of extremely high resistance. They are water soluble. They are slightly acidic and show hydrogen ion concentrations in the neighborhood of pH 6 in aqueous solutions. However, other materials having similar properties do not show the benefits of the selected additives. The following test examples have been selected to indicate the effects of the chosen additives.

TEST 1

Samples of amalgamated zinc dust were placed in 22% $NH_4Cl$ + 10% $Zn\,Cl_2$ solution at 120°F. with results as follows:

| Additive (.1% by wt. of zinc sample) | Gas Evolution Micro liters per hr. per gms of zinc |
| --- | --- |
| None | 396 |
| A | 315 |
| B | 258 |
| C | 243 |
| D | 234 |
| E | 222 |
| F | 188 |
| G | 136 |
| H | 117 |

Additive A is:
  Co-polymer of dimethyl diallyl ammonium chloride and acrylamide. (High molecular weight) (Trade identification Coagulant 2260).
Additive B is:
  Co-polymer of dimethyl diallyl ammonium chloride and diacetone acrylamide. (See example VI, U.S. Pat. No. 3,551,384). (Trade identification conductive polymer 7091).
Additive C is:
  Polyvinlbenzyl-trimethyl ammonium chloride
  High molecular weight in range of 100,000. (See U.S. Pat. No. 3,288,770). (Trade identification ECR-34)
Additive D is:
  Poly dimethyl diallyl ammonium chloride
  (High molecular weight in range of 100,000. This material is described in U.S. Pat. No. 3,288,770). (Trade identification Cat Floc).
Additive E is:
  Copolymer of dimethyl-diallyl-ammonium chloride and methyldodecyl-diallyl-ammonium chloride (nominal aqueous solution viscosity of 10,000 centipoises at 40% active solids). (Trade identification conductive polymer 7092).
Additive F is:
  Copolymer of dimethyl-diallyl ammonium chloride and acrylamide. (Same as additive A except F has lower molecular weight and a lower percentage of polyacrylamide.) (Trade identification coagulant 2256.)
Additive G is:
  Poly-dimethyl-diallyl ammonium chloride. (Same as additive D but lower molecular weight, nominal viscosity 10,000 CPS in 40% active polymer solution, nominal molecular weight in range of 75,000.) (Trade identification conductive polymer 261).
Additive H is:
  Poly-dimethyl-diallyl ammonium chloride. (Same as additives D and G but lower molecular weight in range of 25,000, nominal viscosity 2,000). (Trade identification conductive polymer X-261.) This test clearly shows the ability of the chosen additives to reduce the gassing rate of zinc in a typical LeClanche type electrolyte.

It is to be observed that the 8 examples of test 1 are all polymerized quaternary ammonium salts having at least two methyl groups and having molecular weights with the range of about 2,000 to 100,000. They are all water soluble and are slightly acidic. They can be subdivided into two groups. The first group including four compounds comprises quaternary compounds based upon polymerized dimethyl diallyl ammonium salts and the second group including only one compound, namely, polyvinylbenzyltrimethyl ammonium chloride.

Although the polymers noted above are shown as the chloride salts, other salts such as the bromide, iodide, acetate, sulfate, etc. may be used.

TEST 2

Gassing rate of amalgamated zinc dust in 22% $NH_4Cl$ − 10% $Zn\,Cl_2$ solution at 120°F.

| | |
| --- | --- |
| No additive | 457 micro liters/hr/gm zinc |
| Additive C (1% by wt. of zinc) | 85 micro liters/hr/gm zinc |

Test 3

Gassing rates of amalgamated zinc dust in 22% $NH_4Cl$ − 10% $Zn\,Cl_2$ solution at 120°F.

| | |
| --- | --- |
| No additive | 784 micro liters/hr/gm/zinc |
| Additive - low molecular wt. "C" | 326 micro liters/hr/gm/zinc |

TEST 4

Gassing rates of zinc dust in 22% $NH_4Cl$ − 10% $Zn\,Cl_2$ solution at 120°F.

| Addition Agent (gms per liter of electrolyte) | Gassing rate Micro liters/gm/hr |
| --- | --- |
| None | 48.9 |
| I (2) | 79.8 |
| J (2) | 77.8 |
| K (2) | 50.5 |
| L (2) | 71.0 |
| C (2) | 20.4 |
| C (.5) | 28.4 |

Additive I dodecyl trimethyl ammonium chloride
Additive J hexadecyl trimethyl ammonium chloride
Additive K octadecyl trimethyl ammonium chloride
Additive L dodecyl trimethyl ammonium chloride and tetradecyl trimethyl ammonium chloride These four materials are sold as corrosion inhibitors for use in the cleaning of metallic surfaces. It is to be noted that these materials are quaternary ammonium compounds and that they have many of the characteristics of the chosen materials. Also, they have known corrosion inhibiting characteristics. However, within the compass of galvanic cells, they do not show corrosion inhibiting properties. On the other hand, the materials of test 1, developed and promoted for entirely different uses show the desired properties. A principal difference between the materials of test 1 and test 4 are that the good materials all are polymerized quaternary ammonium salts whereas the poor materials are monomers.

TEST 5

Several small 4 cell dry cell batteries were built and tested on a high rate pulse discharge test as follows: Half the batteries were tested directly after completion. The remaining batteries were tested after storage for a period of time at high temperature with results as follows:

| Mercury level | Addition Agent | Initial Test Pulses | Pulses After Storage |
| --- | --- | --- | --- |
| 0 | 0 | 41–47 | 0 |
| 0 | 1% C (in electrolyte) | 60–74 | 2–8 |
| 7% | 0 | 24–31 | 2–10 |
| 7% | 1% C (in electrolyte) | 86–100 | 29–45 |

It is well known that mercury added to a galvanic cell with a zinc anode migrates to the anode where if forms an amalgam on the surface. As far as the operation of the cell is concerned, it is immaterial how the mercury is added — either as elemental mercury or as a chemical compound. A mercury level of about 7% of the total weight of the anode represents an economic maximum mercury content. In test 5 as well as in all other tests reported, the zinc powder was amalgamated with mercuric chloride in situ at the inception of the test.

TEST 6

Batteries were built and tested in a manner similar to test 5 with results as follows:

| Additive | Initial Performance | | Performance After Storage | |
| --- | --- | --- | --- | --- |
| | Closed Unit Voltage | Pulses | Closed Unit Voltage | Pulses |
| 7% Hg | 5.60 | 87 | 4.88 | 20 |
| 7% Hg & .3% C in electrolyte | 5.63 | 87 | 5.09 | 35 |

Tests 5 and 6 show the effect of one of the chosen additives when actually used in galvanic cells. Test 5 shows the following facts:
 a. that the chosen additive improves the storage behaviour of cells both with and without amalgamated zinc cathodes,
 b. that the additive improves the initial cell performance on high rate pulse testing,
 c. that 1% of additive in the electrolyte gives a performance equal to 7% amalgamation.

Test 6 further shows that one effect of the additive in test cells is to improve the operating voltage.

Since the material probably ends up on the surface of the zinc anode and acts there as a surface agent, the exact quantity added is not critical. Beneficial action has been found with the addition of as little as 0.1% of the electrolyte. Best results have been obtained when the amount of the agent is about 0.3% of the total electrolyte weight. When the additive is much greater than 5% of the electrolyte weight, it may obstruct the cell reactions and reduce the cell capacity. It has been found that the addition agent may be added to the depolarizer mix, to the electrolyte or to the separator material. This latter may be either a starch paste material or a paper type separator. Alternatively, the agent may be precoated on the active surface of the zinc anode.

It is manifest that various modifications can be made of the present invention without departing from the spirit or scope thereof and it is understood that I limit myself only as defined by the appended claims.

Having described my invention and given examples of its use, I now claim:

1. In a galvanic cell comprising a container, a depolarizer mix, a zinc anode, a means for electronically separating the anode from the mix, and an aqueous electrolyte in ionic contact with the anode and the mix, the improvement which comprises: within the container and in contact with the electrolyte a polymerized dimethyl diallyl quaternary ammonium salt selected from the group which consists of:
 polymerized dimethyl diallyl ammonium chloride,
 copolymerized dimethyl diallyl ammonium chloride and acrylamide,
 copolymerized dimethyl diallyl ammonium chloride and
 diacetone acrylamide, and
 copolymerized dimethyl diallyl ammonium chloride and dodecyl ammonium chloride.

2. A galvanic cell as defined in claim 1 wherein the polymerized ammonium salt is polymerized dimethyl diallyl ammonium chloride.

3. A galvanic cell as defined in claim 1 wherein the polymerized ammonium salt is copolymerized dimethyl diallyl ammonium chloride and acrylamide.

4. A galvanic cell as defined in claim 1 wherein the polymerized ammonium salt is copolymerized dimethyl diallyl ammonium chloride and diacetone acrylamide.

5. A galvanic cell as defined in claim 1 wherein the polymerized ammonium salt is co-polymerized dimethyl diallyl ammonium chloride and dodecyl ammonium chloride.

6. A galvanic cell as defined in claim 1 wherein the quantity of ammonium salt is between the limits of 0.1 and 5% of the total volume of electrolyte in the cell.

7. A galvanic cell as defined in claim 1 wherein the polymerized ammonium salt has a molecular weight between approximately 2,000 and 100,000.

8. A galvanic cell as defined in claim 1 the contents of the cell container further including mercury.

9. In a galvanic cell comprising a container, a zinc anode, a depolarizer mix, a means for electronically separating the anode from the mix, an aqueous electrolyte in ionic contact with the anode and the mix, the improvement which comprises: within the container and in contact with the electrolyte an inhibitor, the inhibitor comprising polymerized vinyl-benzyl-tri-methyl-ammonium-chloride.

10. A galvanic cell as defined in claim 9 wherein the molecular weight of the inhibitor is within the limits of 2,000 and 100,000.

11. A galvanic cell as defined in claim 9 wherein the molecular weight of the inhibitor is within the limits of 30,000 and 50,000.

12. A galvanic cell as defined in claim 9 wherein the amount of inhibitor is within the limits of about 0.1 and about 5% of the electrolyte.

13. A galvanic cell as defined in claim 9 wherein the amount of inhibitor is within the limits of 0.5 and 1.5% of the electrolyte.

14. A galvanic cell as defined in claim 9, the contents of the cell container further including mercury.

* * * * *